US006278747B1

(12) United States Patent
Hutchins et al.

(10) Patent No.: US 6,278,747 B1
(45) Date of Patent: Aug. 21, 2001

(54) METHOD AND APPARATUS FOR PERFORMING DIGITAL DETECTION OF DATA STORED ON AN OPTICAL MEDIUM

(75) Inventors: Robert Allen Hutchins; Glen Alan Jaquette, both of Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/039,124

(22) Filed: Mar. 13, 1998

(51) Int. Cl.[7] .............................. H03D 1/00; H04L 27/06
(52) U.S. Cl. ............................. 375/340; 708/290
(58) Field of Search ................................... 375/238, 239, 375/240, 224; 327/58, 62; 364/723, 724.1; 708/290, 313; 360/27, 32, 39, 55

(56) References Cited

U.S. PATENT DOCUMENTS

| | | | |
|---|---|---|---|
| 4,412,339 | * 10/1983 | Alfke et al. | 375/346 |
| 5,293,369 | 3/1994 | Melas et al. | |
| 5,315,284 | 5/1994 | Bentley et al. | |
| 5,345,216 | * 9/1994 | Chopra et al. | 340/146.2 |
| 5,566,034 | * 10/1996 | Shumaker | 360/77.04 |
| 5,940,021 | * 8/1999 | Ahn | 341/155 |
| 5,963,595 | * 10/1999 | Graham et al. | 375/238 |
| 6,084,924 | * 7/2000 | Melas | 375/340 |

FOREIGN PATENT DOCUMENTS 2-236872   9/1990 (JP).

OTHER PUBLICATIONS

Barrett et al., "Timing–based track–following servo for linear tape systems" IEEE Trans. on Magnetics pp. 1872–1877, Jan. 1998.*

Hu et al., "Removal of blocking and ringing artifacts in transform coded images" 1997 IEEE International Conference on Acoustics, Speech and Signal Processing pp. 2565–2568, Apr. 1997.*

* cited by examiner

Primary Examiner—Chi Pham
Assistant Examiner—Jean Corrielus
(74) Attorney, Agent, or Firm—Robert M. Sullivan; Bracewell & Patterson, L.L.P.

(57) ABSTRACT

A method and apparatus for detecting data written on a recording medium are disclosed. The recording medium, such as an optical or magnetic medium, is initially sensed by a transducer to produce an analog data signal waveform. The analog data signal waveform is then digitized by an analog-to-digital convertor to produce a set of digitized data samples. The set of digitized data samples may be equalized to reduce noise. Subsequently, a mid-point sample is inserted between each two samples within the set of equalized data samples utilizing a mid-point interpolation algorithm. With the additional points provided by mid-point interpolation, the absence or presence of a detection event, such as a peak or a transition, between every two samples within the set of equalized data samples are determined.

8 Claims, 9 Drawing Sheets

METHOD AND APPARATUS FOR PERFORMING DIGITAL DETECTION OF DATA STORED ON AN OPTICAL MEDIUM

BACKGROUND OF THE INVENTION

1. Technical Field

The present invention relates to a method and apparatus for data processing in general, and in particular to a method and apparatus for data detection. Still more particularly, the present invention relates to a method and apparatus for performing digital detection of data stored on an optical medium.

2. Description of the Prior Art

Binary data are typically encoded and stored on optical media as a series of optical modulations. A retrieval of these stored data requires a synchronous clock from a self-clocking analog signal waveform and a detect-and-decode system in a read channel to reconstruct the original binary data. An important element within the read channel is a waveform detector. The waveform detector may be a transition detector (commonly known as a zero-crossing detector) or a peak detector. Generally speaking, transition detectors are utilized for detecting data in Pulse-Width Modulation (PWM) recordings and peak detectors are utilized for detecting data in Pulse-Position Modulation (PPM) recordings.

Digital waveform detectors typically rely on discrete-signal embodiments of well-known analog detection techniques. In essence, an analog signal waveform is initially sampled and then digitized. The digitized samples are subsequently processed digitally to attenuate any unwanted frequency components in order to reconstruct the synchronous clock and data.

Figure 9A:
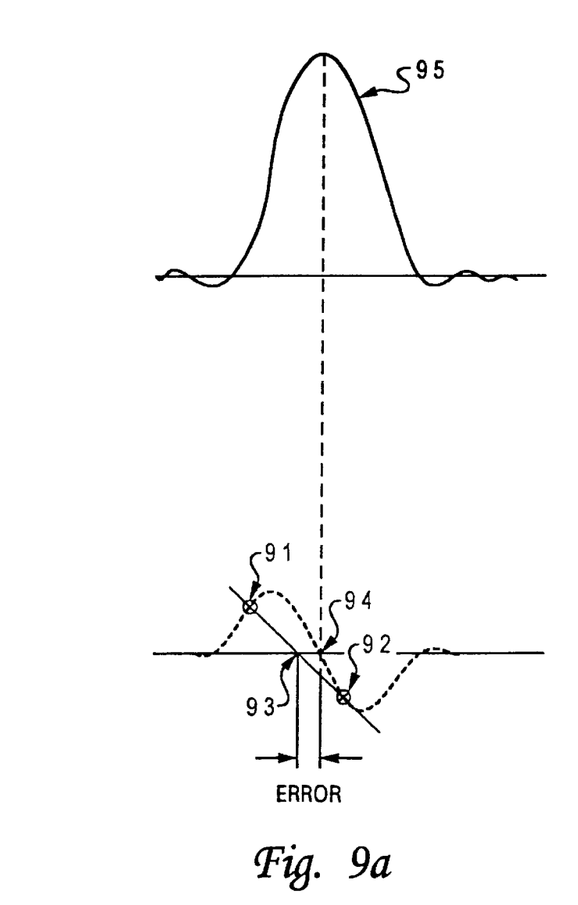
FIGS. 9a and 9b are exemplary waveforms from a PPM recording along with their respective detection samples.

One of the more commonly known digital waveform detectors for the detection of data stored on optical disks is called an asynchronous digital waveform detector. The asynchronous digital waveform detector utilizes a straight-line approximation to estimate the location of a detection event—either a peak for PPM recordings or a transition for PWM recordings. This method works well as long as the sample rate is greater than five samples per sinusoid, where a sinusoid describes the highest frequency tone that can be written on optical storage media. Although this sample rate is not considered to be very high, there are at least two reasons why it is desirable to lower the sample rate even further. First, the design of digital circuits will be easier and the power consumption of the entire digital module will be lower if the speed at which the digital logic is required to operate is decreased. Second, under some circumstances, the number of synthesizers can be reduced from two to one, making the digital module count lower and the electronics footprint smaller, which translates to a lower total cost. As the sample rate becomes lower, however, the estimated location of a detection event obtained by straight-line approximation becomes less accurate. For example, as shown in FIG. 9a, an estimate sample at location 93 obtained by a straight-line approximation of actual received samples 91 and 92, does not coincide with actual peak location 94 of an analog signal waveform 95 from a PPM recording. Consequently, it would be desirable to provide an improved method for performing digital detection for data stored on an optical medium at a relatively low sampling rate, without sacrificing detection accuracy.

SUMMARY OF THE INVENTION

In view of the foregoing, it is therefore an object of the present invention to provide an improved method and apparatus for data processing.

It is another object of the present invention to provide an improved method and apparatus for data detection.

It is yet another object of the present invention to provide an improved method and apparatus for performing digital detection of data stored on an optical medium.

In accordance with a method and system of the present invention, a recording medium, such as an optical or magnetic medium, is initially sensed by a transducer to produce an analog data signal waveform. The analog data signal waveform is then digitized by an analog-to-digital convertor to produce a set of digitized data samples. The set of digitized data samples may be equalized to reduce noise. Subsequently, a mid-point sample is inserted between each two samples within the set of equalized data samples utilizing a mid-point interpolation algorithm. With the additional points provided by mid-point interpolation, the absence or presence of a detection event, such as a peak or a transition, between every two samples within the set of equalized data samples are determined.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
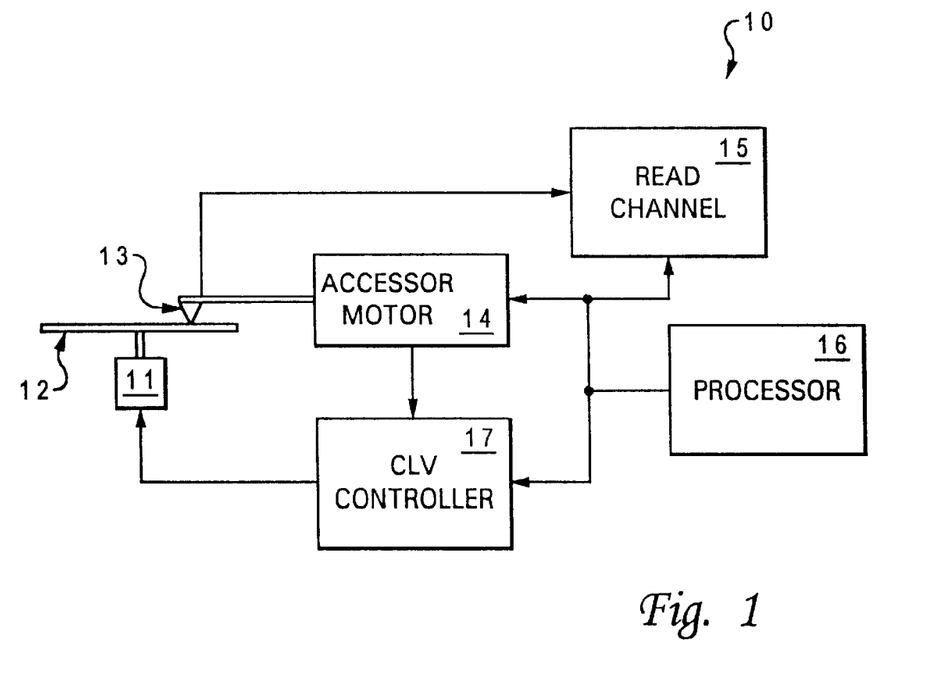
FIG. 1 is a block diagram of a constant linear velocity optical disk drive in which a preferred embodiment of the present invention may be implemented.

Referring now to the drawings and in particular to FIG. 1, there is illustrated a block diagram of a constant linear velocity (CLV) optical disk drive in which a preferred embodiment of the present invention may be implemented. As shown, optical disk drive 10 includes a variable speed motor 11 that rotates an optical disk 12. Optical disk 12, such as a compact disk (CD) or a digital versatile disk (DVD), typically has a single spiral track from an inner diameter to an outer diameter. An optical read head 13, which includes a laser and a servo system, follows the spiral track to read the information recorded on the spiral track. An accessor motor 14 moves optical read head 13 slowly and radially across the surface of optical disk 12 to access the spiral track at specified locations. This capability is called random access and is important, for example, for non-sequential data processing.

The information gathered by optical read head 13 is sent to a read channel 15 for detection and further transmission. The addressing of the desired information is directed by a processor 16 which also controls read channel 15. A CLV controller 17 responds to the radial position of optical read head 13 to adjust the rotation speed of motor 11 so as to maintain a constant linear velocity across the full recording surface of rotating optical disk 12. Since different locations of the spiral track are of different distances from a center hub (not shown), the rotation speed of motor 11 must be adjusted in order to compensate for a given distance of optical read head 13 from the center hub. As such, data located at the inner track will be read and written at the same linear velocity (in the track direction) as those located at the outer track. This arrangement maximizes the data storage capacity of optical disk 12.

Figure 2:
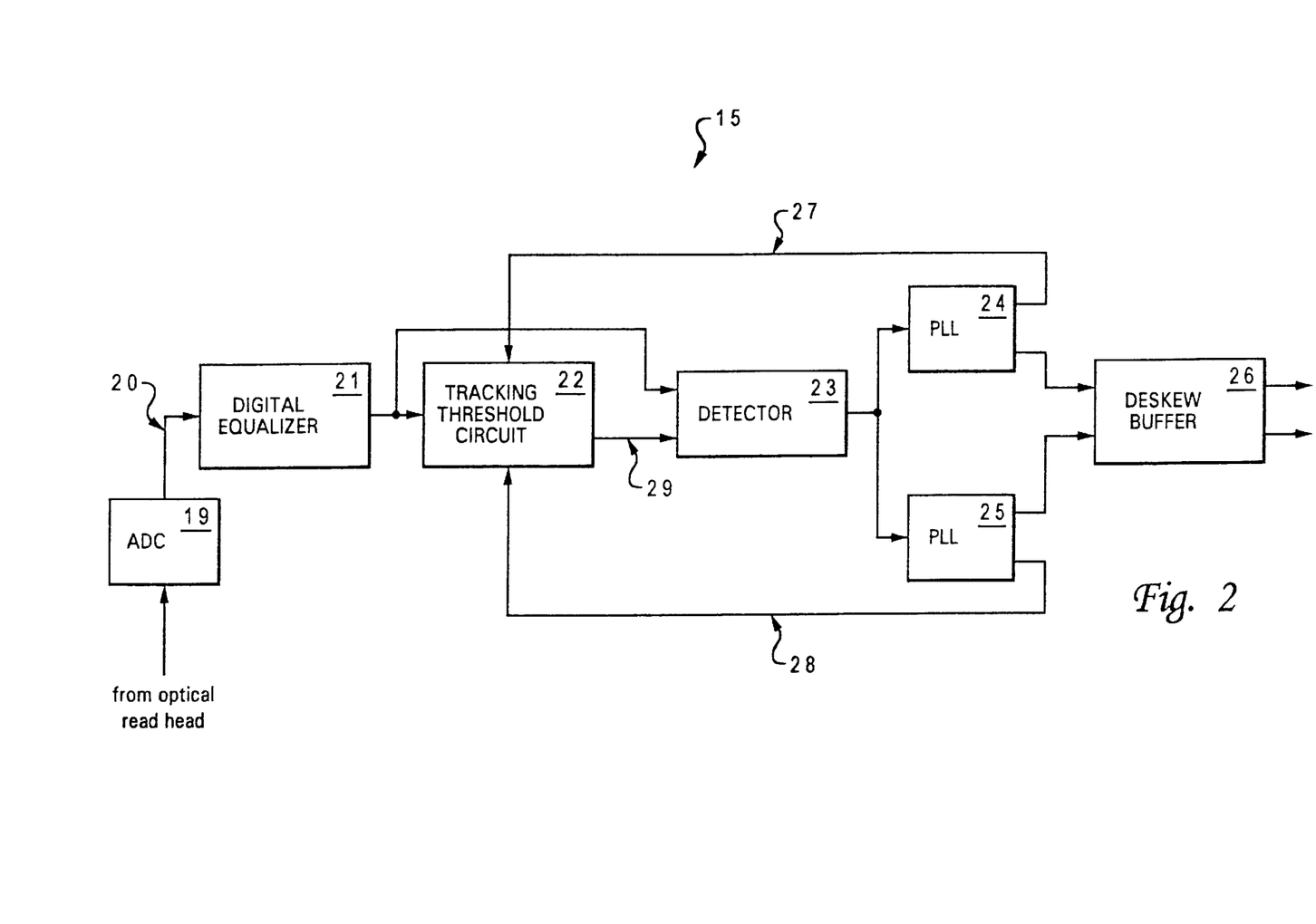
FIG. 2 is a detailed block diagram of the read channel from FIG. 1, in accordance with a preferred embodiment of the present invention.

With reference now to FIG. 2, there is a detailed block diagram of read channel 15 from FIG. 1, in accordance with a preferred embodiment of the present invention. A bus 20 provides a data signal waveform read by optical read head 13 to a digital equalizer 21, after the data signal waveform is digitized by an analog-to-digital converter 19. Digital equalizer 21 attenuates some of the noise from the digitized data signal waveform and shapes the digitized data signal waveform. The output of digital equalizer 21 is then sent to both tracking threshold circuit 22 and detector 23.

With respect to pulse-width modulation recordings, for example, tracking threshold circuit 22 estimates a centerline value of the digital signal waveform which lies midway between the maximum and the minimum magnitudes of the output from digital equalizer 21. This centerline value is also sent to detector 23 for centering the signal amplitude. Outputs from tracking threshold circuit 22 and digital equalizer 21 are utilized by detector 23 to determine bit cell positions at which the negative and the positive transitions of the input data occur. Essentially, the tracking threshold value is subtracted from the instantaneous value of the sample at the output of digital equalizer 21, and detector 23 estimates the location of the transition. Digital phase-locked loops (PLLs) 24 and 25 control the timing for determining the transition locations.

PLLs 24 and 25 lock onto the frequency of the data, utilizing either or both the positive and the negative transitions. Each of PLLs 24 and 25 provides phase error signals 27 and 28 as two additional inputs to tracking threshold circuit 22. Phase error signals 27 and 28 are utilized to lock tracking threshold signal 29 to a correct level, as well as to provide sample clocking. PLLs 24 and 25 also provide outputs to a deskew buffer 26.

In accordance with a preferred embodiment of the present invention, the performance of detector 23 may be improved by utilizing a mid-point interpolation algorithm to estimate an amplitude of a sample between every two actual received samples. With this estimated mid-point, a straight-line interpolation algorithm is subsequently utilized to further estimate the location of a detection event. Although the concept of mid-point interpolation may seem to be relatively easy, the implementation of this concept within detector 23 is fairly complex. In order to detect a peak in a Pulse-Position Modulation (PPM) waveform or a transition in a Pulse-Width Modulation (PWM) waveform, the peak or the transition must be detected and the signal must be greater than a tracking threshold. Furthermore, two mid-point samples must be available: (1) the mid-point of a PPM or PWM waveform and (2) the mid-point of a tracking threshold. In a preferred embodiment, an algorithm utilized to interpolate mid-points for a data signal waveform is as follows:

$$\frac{-x(n-3) + 9x(n-2) + 9x(n-1) - x(n)}{16} \tag{1}$$

where x(n) are digitized data samples.

Figure 3:
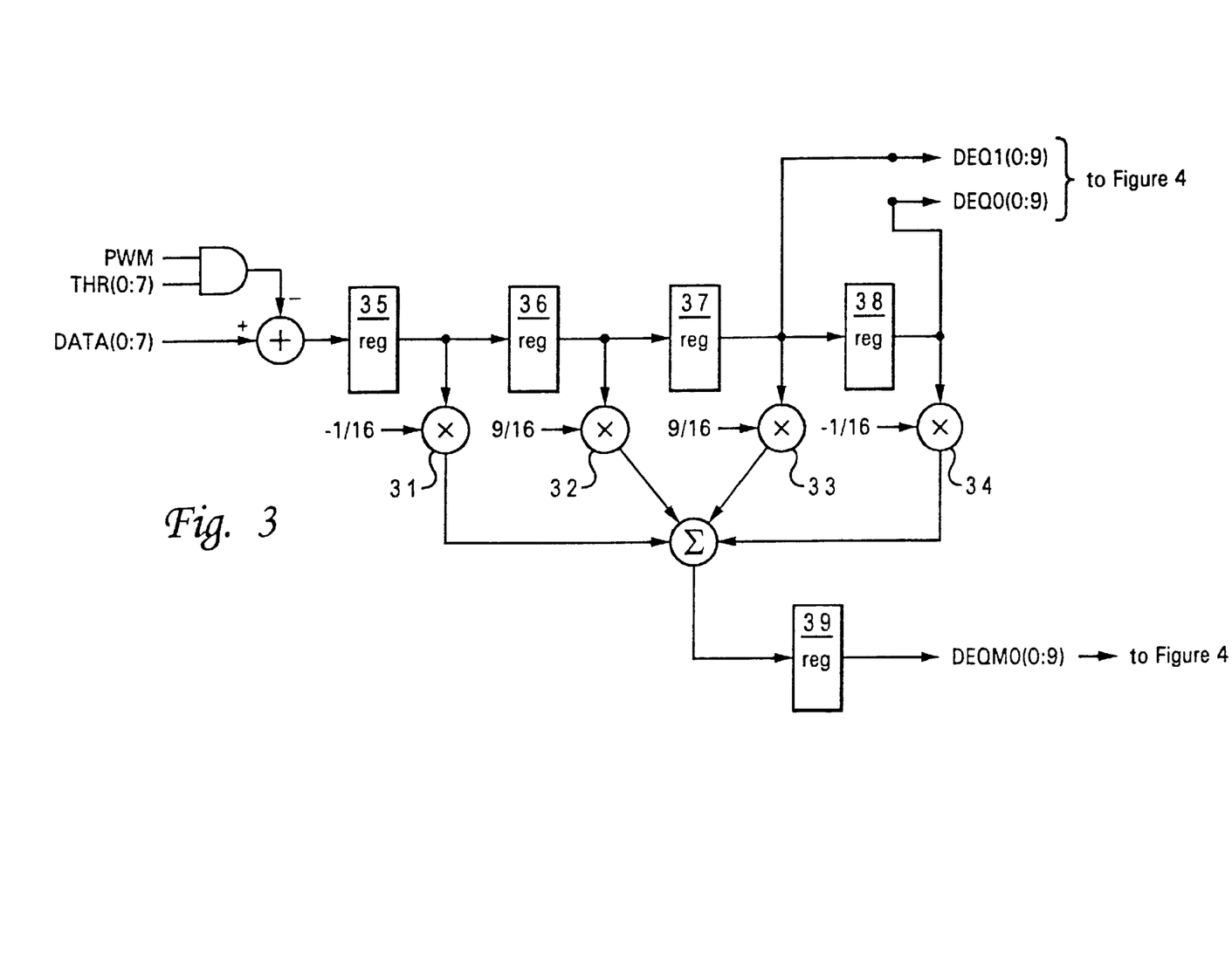
FIG. 3 is a block diagram of a circuit for performing mid-point interpolation on a digitized PWM data signal waveform, in accordance with a preferred embodiment of the present invention.

Referring now to FIG. 3, there is illustrated a block diagram of a circuit for performing mid-point interpolation on a digitalized PWM data signal waveform, in accordance with a preferred embodiment of the present invention. As shown, four tap multipliers 31–34 and four registers 35–38 are utilized to implement equation (1). Digitized data samples are first entered via register 35, and the digitized data samples are then successively shifted through registers 36–38. At each stage, a multiplication is performed by utilizing a corresponding coefficient. The sum is subsequently sent to register 39 for output. Although four tap multipliers 31–36 are utilized in this embodiment, the number of tap multipliers may vary, depending upon the mid-point interpolation algorithm. Furthermore, an exemplary set of coefficients, −1/16, 9/16, 9/16, −1/16, is shown in FIG. 3; however, a more general representation of the coefficients should be: −1/N, [(N/2)+1]/N, [(N/2)+1]/N, −1/N, where N is a power of two. Because the denominators of the coefficients are power of 2 numbers, this means that divisions can be performed relatively easy. Note that signal THR(0:7) is the same tracking threshold signal 29 (from FIG. 2) utilized to determine the center of a digitized waveform. As for the output, DEQM0(0:9) is an estimated mid-point sample located between sample DEQ0(0:9) and sample DEQ1(0:9). Once the mid-point sample is determined, the location at which a transition occurred needs to be resolved. In other words, whether the transition occurs between sample DEQ0 (0:9) and estimated mid-point sample DEQM0(0:9) or between estimated mid-point sample DEQM0(0:9) and sample DEQ1(0:9).

Figure 4:
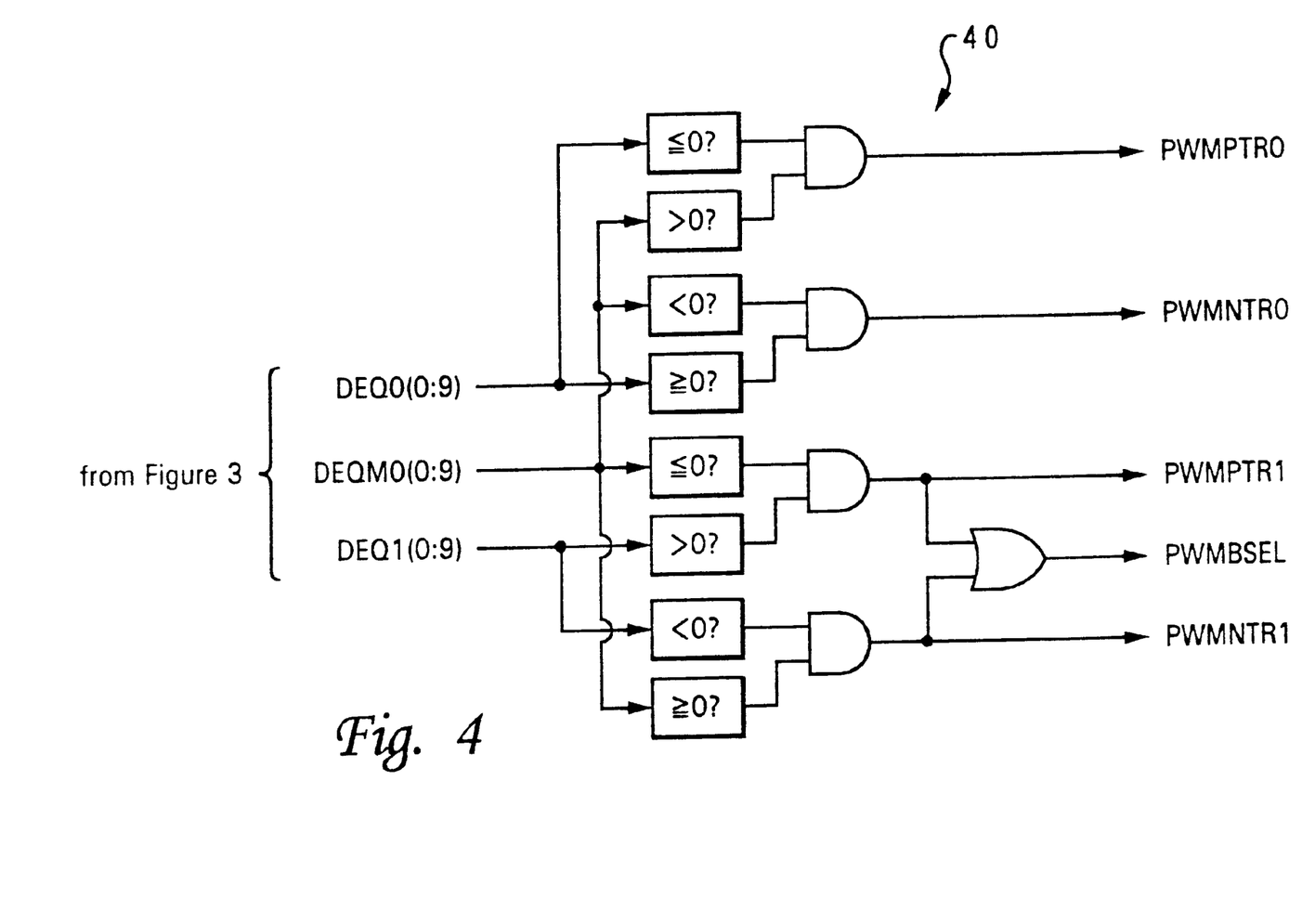
FIG. 4 is a block diagram of a circuit for selecting the pairs of samples that contain a transition for a PWM data signal waveform, in accordance with a preferred embodiment of the present invention.

With reference now to FIG. 4, there is depicted a block diagram of a circuit for selecting the pairs of samples that contain a transition for a digitized PWM data signal waveform, in accordance with a preferred embodiment of the present invention. As shown, circuit 40 includes a set of comparators and logic gates such as four AND gates and one OR gate. An output signal PWMBSEL is utilized to identify if a transition occurred and if so, which of the halves the transition occurred in. If signal PWMBSEL is set, the transition occurred between sample DEQ0(0:9) and estimated mid-point sample DEQM0(0:9); otherwise, the transition occurred between estimated mid-point sample DEQM0(0:9) and sample DEQ1(0:9) or not at all.

Figure 5:
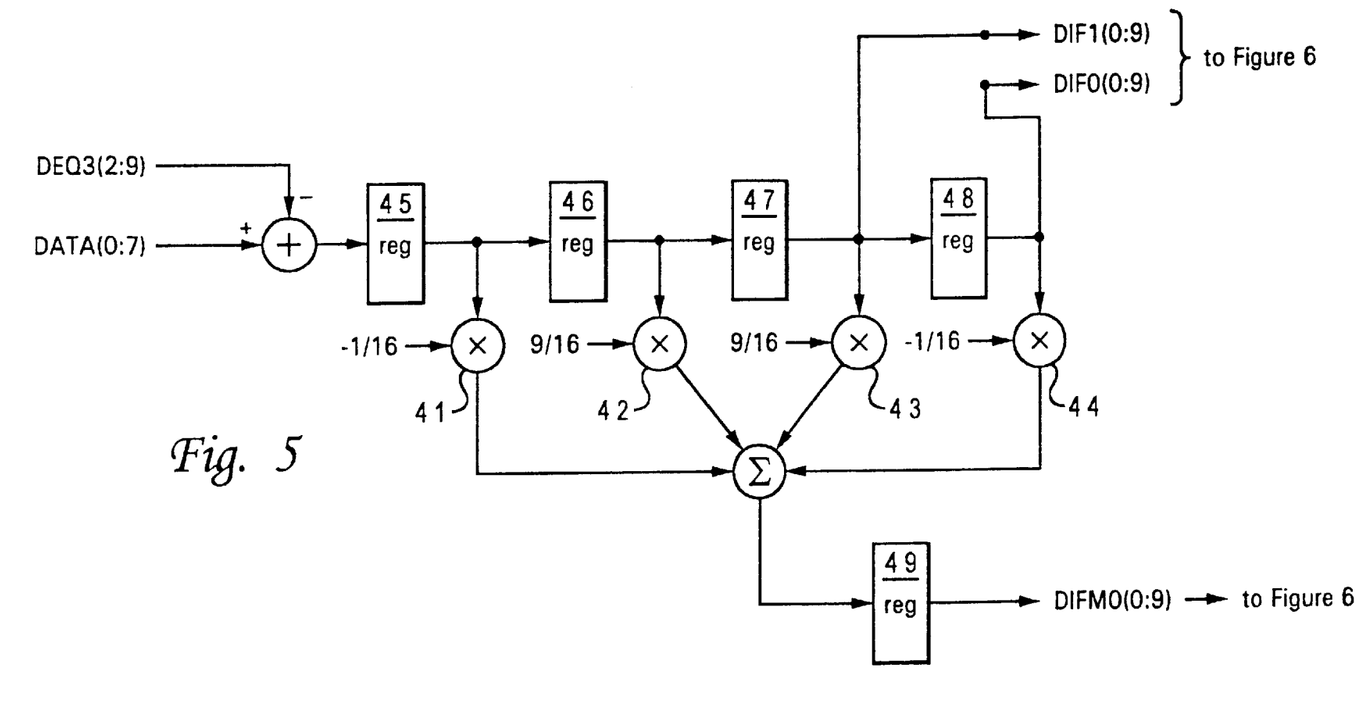
FIG. 5 is a block diagram of a circuit for performing mid-point interpolation on a digitized PPM data signal waveform, in accordance with a preferred embodiment of the present invention.

Referring now to FIG. 5, there is illustrated a block diagram of a circuit for performing mid-point interpolation on a digitized PPM data signal waveform, in accordance with a preferred embodiment of the present invention.

Similar to the mid-point interpolation circuit shown in FIG. 3, four tap multipliers 41–44 and four registers 45–48 are utilized to implemented equation (1). Digitized data samples are first entered via register 45, and the digitized data samples are then successively shifted through registers 46–48. At different stages, a multiplication is performed by utilizing a corresponding coefficient. The sum is subsequently sent to register 49 for output. Here, the tracking threshold signal is not utilized directly in pulse detection, but rather the tracking threshold signal is utilized as a qualifier instead. Accordingly, the required precision of the threshold detector is less than what is required in the transition detection. For this reason, a simpler embodiment, such as averaging of two adjacent samples, may be adequate to estimate the value of a tracking threshold signal at a mid-point. An averaging circuit for implementing such is well-known to those skilled in art.

Figure 6:
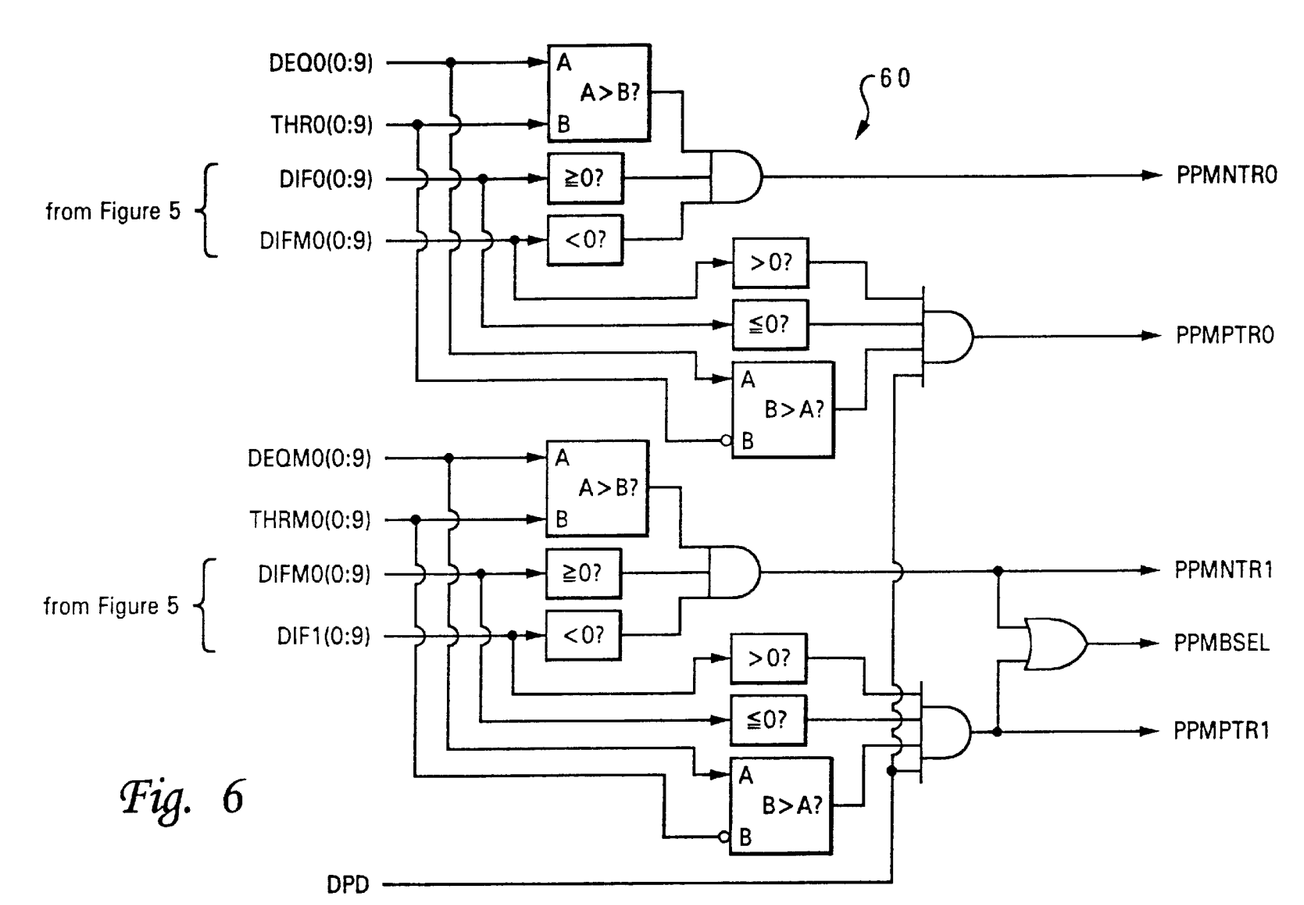
FIG. 6 is a block diagram of a circuit for selecting the pairs of samples that contain a peak for a PPM data signal waveform, in accordance with a preferred embodiment of the present invention.

With reference now to FIG. 6, there is depicted a block diagram of a circuit for selecting the pairs of samples that contain a peak for a PPM data signal waveform, in accordance with a preferred embodiment of the present invention. Similar to circuit 40 in FIG. 4, circuit 60 also includes a set of comparators and logic gates for sample pairs selection. A signal PPMBSEL is utilized to identify which of the halves the peak occurred in. If signal PPMBSEL is set, the peak occurred between estimated mid-point sample DIFM0(0:9) and sample DIF1(0:9); otherwise, the peak occurred between sample DIF0(0:9) and estimated mid-point sample DIFM0(0:9) or not at all.

Figure 7:
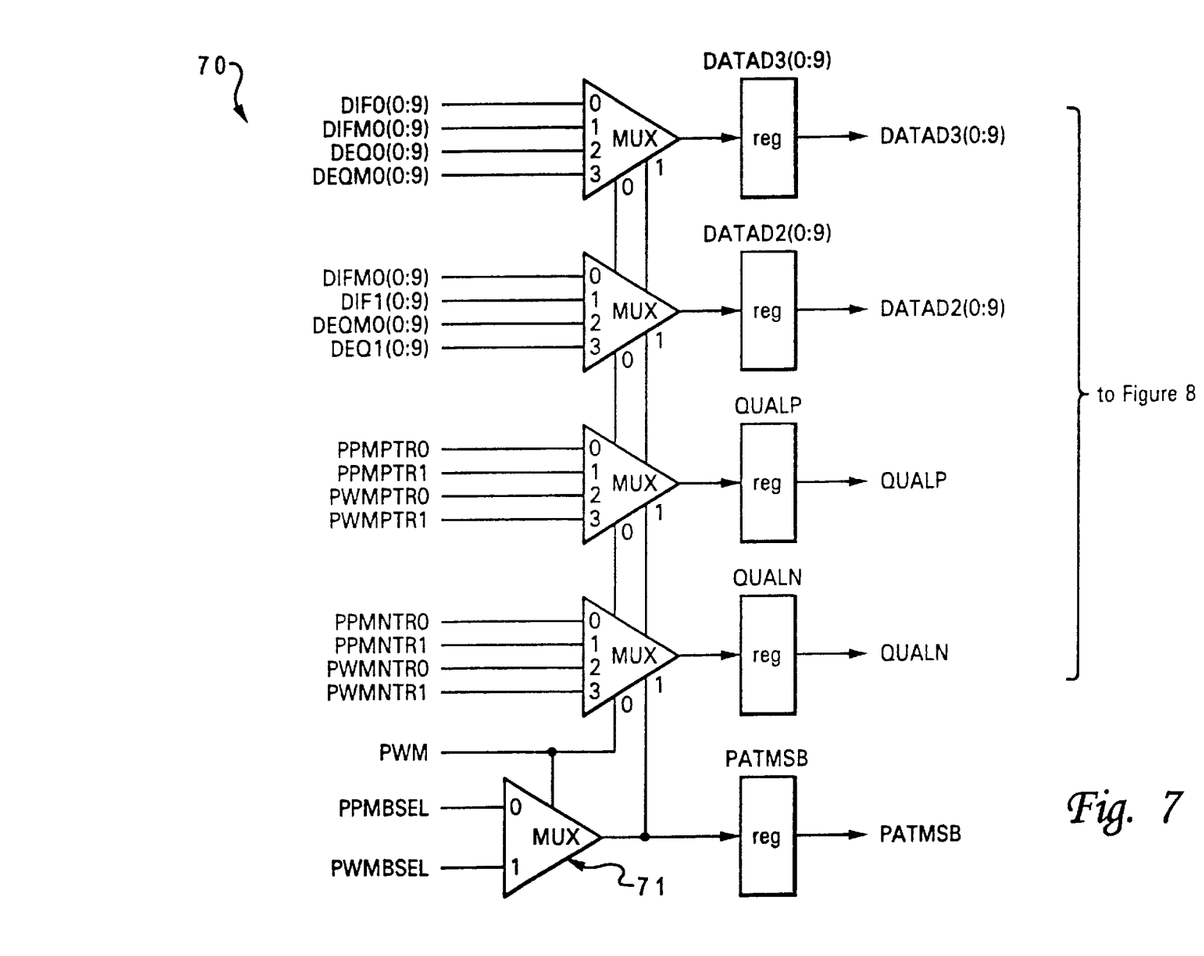
FIG. 7 is a block diagram of a circuit for selecting sample pairs that are utilized by the mid-point interpolation algorithm, in accordance with a preferred embodiment of the present invention.

Referring now to FIG. 7, there is illustrated a block diagram of a circuit for selecting sample pairs that are utilized by the straight-line interpolation algorithm, in accordance with a preferred embodiment of the present invention. Two pairs of samples, DATAD3 (0:9) and DATAD2 (0:9), are selected for estimating a location of a detection event (i.e., a peak or a transition), two qualifiers, QUALP and QUALN, are selected for qualifying the detection event, and the most significant bit, PATMSB, is selected to match the half sample cell that the detection event occurred in. Since circuit 70 is designed for accommodating both PWM signals (coming from FIG. 4) and PPM signals (coming from FIG. 6), a PWM input is utilized to control multiplexor 71 for selecting between PWM signals and PPM signals. As a preferred embodiment, PWM input will be asserted in order to receive PWM signals.

Figure 8:
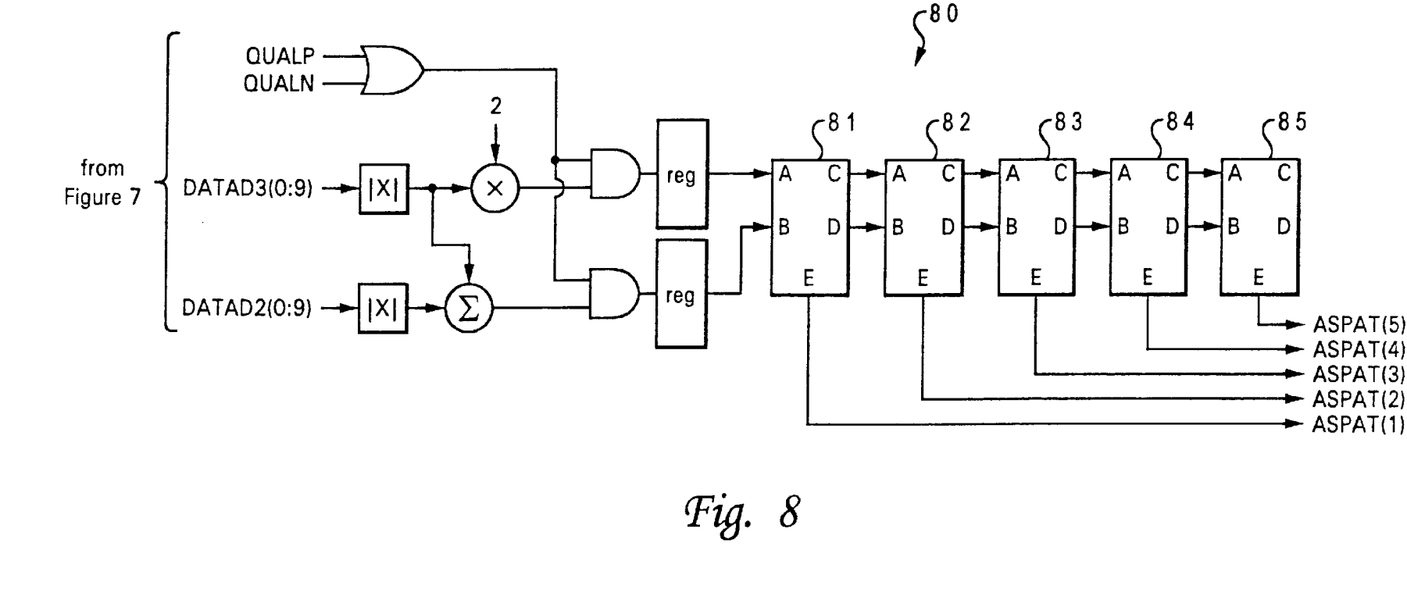
FIG. 8 is a block diagram of a circuit for determining the location of a detection event by straight-line interpolation, in accordance with a preferred embodiment of the present invention.

With reference now to FIG. 8, there is depicted a block diagram of a circuit for determining the location of a detection event by straight-line interpolation, in accordance with a preferred embodiment of the present invention. Circuit 80 determines the location of a detection event by implementing the following equation:

$$ASPAT = \frac{|DATAD3|}{|DATAD3| + |DATAD2|} \quad (2)$$

Since six bits of resolution are typically utilized in the measurement, five division blocks 81–85 are required for this implementation (the most significant bit, PATMSB, is determined earlier in FIG. 7). Each of division blocks 81–85 performs a binary division. The implementation of division blocks 81–85 is well-known to those skilled in the relevant art. Needless to say, a division by powers of two is preferable because it is easy to implement in digital logic.

Figure 9B:
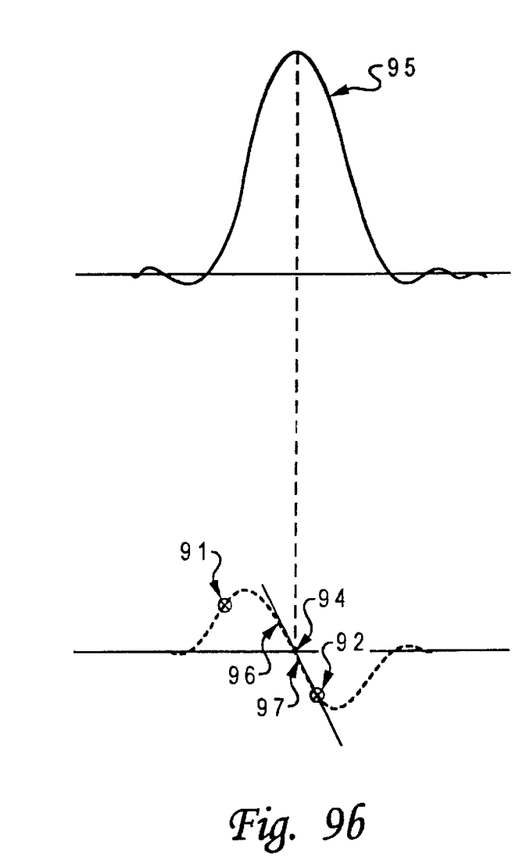

As shown in FIG. 9b, a mid-point sample obtained by a mid-point interpolation algorithm is first inserted at location 96. Then, a straight-line approximation is performed between the mid-point sample at location 96 and actual received sample 92 to determine an estimate peak of analog signal waveform 95. The estimate peak is ASPAT from equation (2). With the mid-point sample, the estimate peak at location 97 comes very close to actual peak location 94.

As has been described, the present invention provides an improved method and apparatus for detecting data written on an optical medium. The data detection method as disclosed is very important in cost-sensitive low-end products because the cost of drives, the number of modules, and the footprint of electronics can all be reduced. For example, when five samples per sinusoid are needed by a read detection channel, two clock crystals are required: one for controlling the write logic and the other one for controlling the read detection logic. If the sample rate of the read detection channel can be reduced to four samples per sinusoid, then only one crystal is required. As for high-end products, the improvement in the resolution of the digital detector can contribute to improving system reliability. Furthermore, the jitter associated with straight-line approximation will be reduced such that the margin to failure will also be improved.

Although optical media are utilized throughout this entire disclosure to illustrate the present invention, it is understood by those skilled in the art that the present invention is also applicable to magnetic media as well. In addition, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performing digital detection of data stored on a recording medium, said method comprising the steps of:

sensing said recording medium by a transducer to produce an analog data signal waveform;

digitizing said analog data signal waveform by an analog-to-digital convertor to produce a set of digitized data samples;

between two samples within said set of digitized data samples, calculating a mid-point sample position utilizing a mid-point interpolation algorithm; and utilizing said mid-point sample position and one of said two samples to determine a detection event position between said two samples within said set of digitized data samples via a straight-line interpolation algorithm.

2. The method according to claim 1, wherein said step of utilizing a mid-point interpolation algorithm further includes a step of multiplying digitized data samples with coefficients: $-1/N$, $[(N/2)+1]/N$, $[(N/2)+1]/N$, $-1/N$, where N is a power of two.

3. The method according to claim 1, wherein said mid-point sample position and one of said two samples have identical signs.

4. The method according to claim 1, wherein said straight-line interpolation algorithm is performed by $|sample1|/(|sample1|+|sample2|)$, where sample1 is said mid-point sample position and sample2 is one of two samples.

5. A digital detector for detecting data written on a recording medium, comprising:
- a transducer for sensing said recording medium to produce an analog data signal waveform;
- an analog-to-digital convertor, coupled to said transducer, for digitizing said analog data signal waveform to produce a set of digitized data samples;
- means for calculating a mid-point sample position between two samples within said set of digitized data samples utilizing a mid-point interpolation algorithm; and
- means for determining a detection event position between said two samples within said set of digitized data samples utilizing said mid-point sample position and one of mid two samples via a straight-line interpolation algorithm.

6. The digital detector according to claim 5, wherein said mid-point interpolation algorithm further includes a means for multiplying digitized data samples with coefficients: $-1/N$, $[(N/2)+1]/N$, $[(N/2)+1]/N$, $-1/N$, where N is a power of two.

7. The digital detector according to claim 5, wherein said mid-point sample position and one of said two samples have identical signs.

8. The digital detector according to claim 5, wherein said straight-line interpolation algorithm is performed by $|sample1|/(|sample1|+|sample2|)$, where sample1 is said mid-point sample position and sample2 is one of said two samples.

* * * * *